United States Patent
Kinoshita et al.

(10) Patent No.: US 11,171,537 B2
(45) Date of Patent: Nov. 9, 2021

(54) ELECTRIC COMPRESSOR FOR A VEHICLE

(71) Applicant: KABUSHIKI KAISHA TOYOTA JIDOSHOKKI, Kariya (JP)

(72) Inventors: Yusuke Kinoshita, Aichi-ken (JP); Shingo Enami, Aichi-ken (JP); Junya Yano, Aichi-ken (JP); Shigehiro Kasho, Aichi-ken (JP); Masato Tsukahara, Aichi-ken (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 313 days.

(21) Appl. No.: 16/366,377

(22) Filed: Mar. 27, 2019

(65) Prior Publication Data
US 2019/0305467 A1 Oct. 3, 2019

(30) Foreign Application Priority Data
Mar. 29, 2018 (JP) .............................. JP2018-065980

(51) Int. Cl.
*H02K 11/33* (2016.01)
*H02K 5/22* (2006.01)
(Continued)

(52) U.S. Cl.
CPC .......... *H02K 5/225* (2013.01); *B60H 1/3222* (2013.01); *H01R 13/50* (2013.01);
(Continued)

(58) Field of Classification Search
CPC .............................. H02K 11/33; H02K 5/225
See application file for complete search history.

(56) References Cited

U.S. PATENT DOCUMENTS 7,461,873 B2 * 12/2008 Machida ................. E05B 81/20
292/337
2004/0132341 A1 7/2004 Noguchi et al.
(Continued)

FOREIGN PATENT DOCUMENTS

CN 101188339 A 5/2008
CN 103244377 A 8/2013
(Continued)

OTHER PUBLICATIONS

Communication dated Apr. 29, 2020, from the State Intellectual Property Office in application No. 201910242654.8.

*Primary Examiner* — Dang D Le
(74) *Attorney, Agent, or Firm* — Sughrue Mion, PLLC

(57) ABSTRACT

An electric compressor for a vehicle includes an inverter, a motor, and a first connector and a second connector electrically connecting an in-vehicle power supply and the motor with the first connector and the second connector being fitted to each other. The first connector includes a tubular receiving portion made of resin and a first conductive portion disposed inside the receiving portion. The second connector includes a tubular insertion portion made of resin and insertable into the receiving portion, and a second conductive portion disposed inside the insertion portion and connected to the first conductive portion. A rib is disposed between an inner surface of the receiving portion and an outer surface of the insertion portion. The rib is formed integrally with one of the inner surface and the outer surface, and is in contact with the other of the inner surface and the outer surface.

2 Claims, 4 Drawing Sheets

(51) Int. Cl.
- *H01R 13/50* (2006.01)
- *H01R 13/6582* (2011.01)
- *H02K 5/24* (2006.01)
- *B60H 1/32* (2006.01)
- *H02K 11/01* (2016.01)

(52) U.S. Cl.
CPC ........... *H01R 13/6582* (2013.01); *H02K 5/24* (2013.01); *H02K 11/0141* (2020.08); *H02K 11/33* (2016.01); *B60H 2001/3292* (2013.01)

(56) References Cited

U.S. PATENT DOCUMENTS

2013/0202461 A1\* 8/2013 Enami .................. F04B 39/121
                                                                417/410.1
2015/0054365 A1    2/2015 Kinoshita et al.

FOREIGN PATENT DOCUMENTS

| | | |
|---|---|---|
| JP | 2002198127 A | 7/2002 |
| JP | 2015-040548 A | 3/2015 |
| KR | 20030092395 A | 12/2003 |

\* cited by examiner

ELECTRIC COMPRESSOR FOR A VEHICLE

CROSS-REFERENCE TO RELATED APPLICATION

This application claims priority to Japanese Patent Application No. 2018-065980 filed on Mar. 29, 2018, the entire disclosure of which is incorporated herein by reference.

BACKGROUND ART

The present disclosure relates to an electric compressor for a vehicle.

An electric compressor for a vehicle includes an inverter that converts direct current electric power supplied from an in-vehicle power supply into alternating current electric power and outputs such alternating current electric power, and a motor that is driven by alternating current electric power outputted from the inverter. Japanese Patent Application Publication No. 2015-40548 discloses an electric compressor for a vehicle including a first connector that is connected to an in-vehicle electric power supply through a power wire and a second connector that is fitted to the first connector. The second connector is electrically connected to the inverter. The in-vehicle electric power supply and the inverter are electrically connected to each other by fitting the first connector and the second connector to each other.

When the power wire connected to the first connector swings due to vibration caused by the traveling of the vehicle or the like, dislocation of the first connector and the second connector relative to each other occurs. As a result, abrasion occurs in the first connector and the second connector.

The present disclosure is directed to providing an electric compressor for a vehicle that permits suppressing the relative dislocation of the first connector and the second connector.

SUMMARY

In accordance with an aspect of the present disclosure, there is provided an electric compressor for a vehicle including an inverter that converts direct current electric power supplied from an in-vehicle power supply to alternating current electric power, a motor driven by the alternating current electric power outputted from the inverter, and a first connector and a second connector electrically connecting the in-vehicle power supply and the motor with the first connector and the second connector being fitted to each other. The first connector includes a tubular receiving portion made of resin and a first conductive portion disposed inside the receiving portion. The second connector includes a tubular insertion portion made of resin and insertable into the receiving portion, and a second conductive portion disposed inside the insertion portion and connected to the first conductive portion. A rib is disposed between an inner surface of the receiving portion and an outer surface of the insertion portion. The rib is formed integrally with one of the inner surface and the outer surface, and is in contact with the other of the inner surface and the outer surface.

Other aspects and advantages of the invention will become apparent from the following description, taken in conjunction with the accompanying drawings, illustrating by way of example the principles of the invention.

BRIEF DESCRIPTION OF THE DRAWINGS

The invention together with objects and advantages thereof may best be understood by reference to the following description of the presently preferred embodiments together with the accompanying drawings in which.

DETAILED DESCRIPTION OF THE EMBODIMENTS

The following will describe an embodiment of the present disclosure with reference to the accompanying drawings. An electric compressor for a vehicle of the present embodiment is used, for example, for a vehicle air conditioner. In the following description, the electric compressor is referred to as an electric compressor 10.

Figure 1:
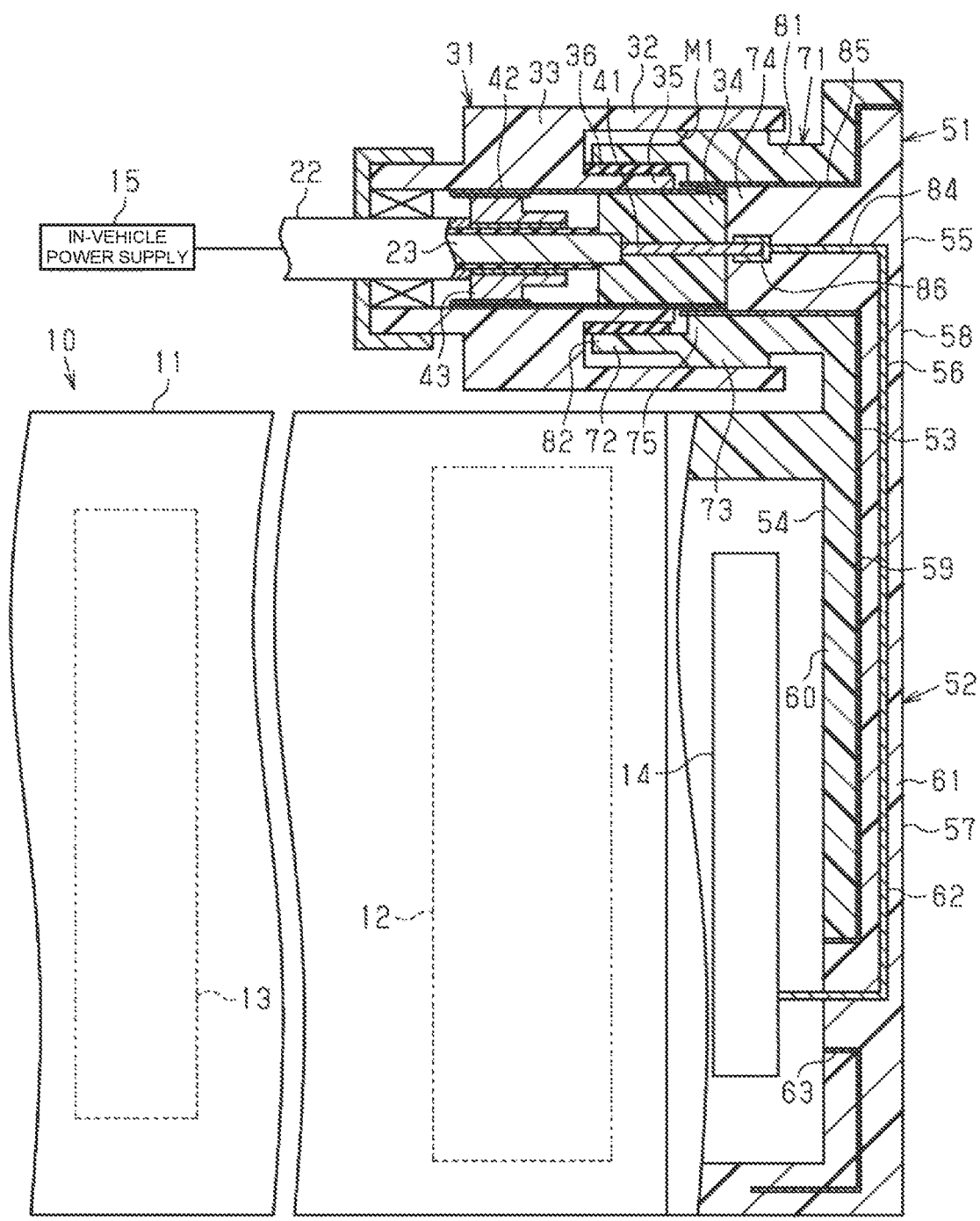
FIG. 1 is a partial schematic view showing an electric compressor for a vehicle according to the present disclosure.
Figure 2:
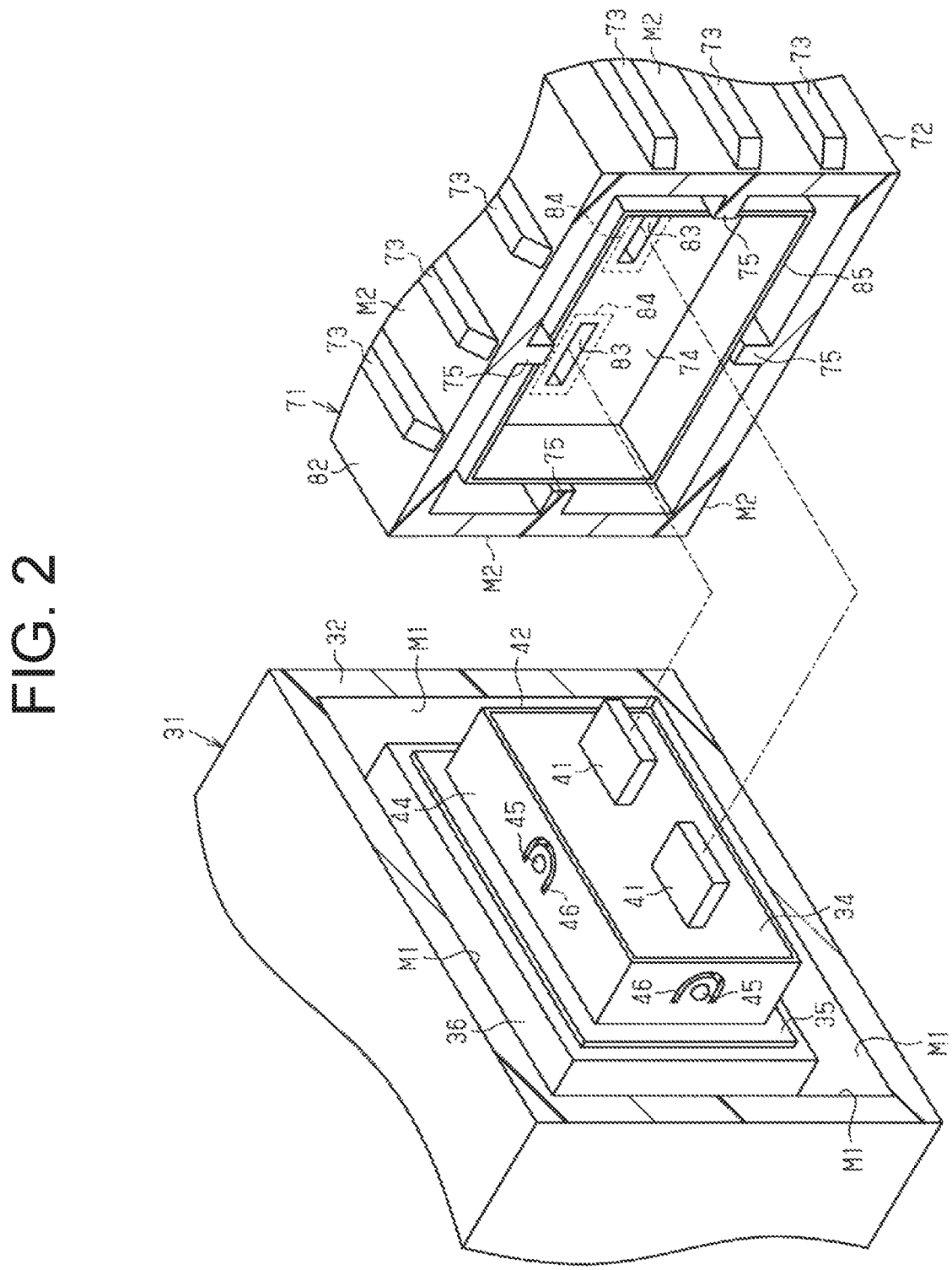
FIG. 2 is a perspective view of a vehicle-side connector and a compressor-side connector.

As shown in FIGS. 1 and 2, then electric compressor 10 includes a housing 11, a motor 12, and a refrigerant compressor 13 that compresses a refrigerant as a fluid. The motor 12 and the refrigerant compressor 13 are accommodated in the housing 11. The electric compressor 10 compresses a refrigerant in the refrigerant compressor 13 driven by electric power supplied to the motor 12.

The electric compressor 10 includes an inverter 14 for supplying alternating current electric power to the motor 12. The inverter 14 is a three-phase inverter that converts direct current electric power supplied from an in-vehicle electric power supply 15 to alternating current electric power and outputs the converted alternating current electric power. The inverter 14 and the motor 12 are connected by a hermetic terminal (not shown). The motor 12 is a three-phase alternating current electric motor driven by electric power supplied from the inverter 14.

The electric compressor 10 includes a vehicle-side connector 31 electrically connected to the in-vehicle electric power supply 15 and a compressor-side connector 71 electrically connected to the inverter 14. The vehicle-side connector 31 and the compressor-side connector 71 correspond to the first connector and the second connector, respectively, of the present disclosure. The in-vehicle electric power supply 15 and the inverter 14 are electrically connected by connecting the vehicle-side connector 31 and the compressor-side connector 71.

Figure 3:
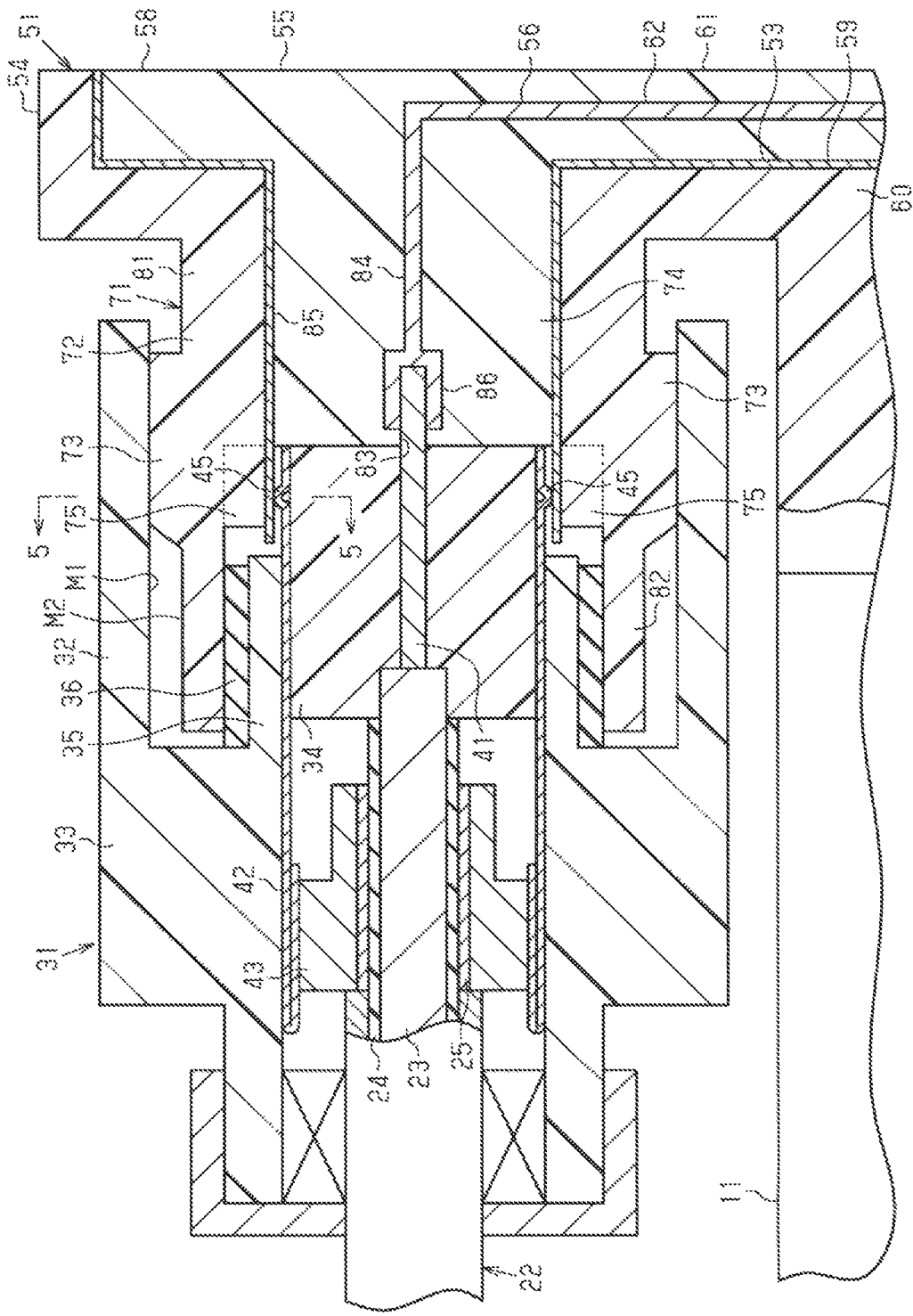
FIG. 3 is a cross-sectional view of the vehicle-side connector and the compressor-side connector.

As shown in FIG. 3, a power wire 22 is connected to the vehicle-side connector 31. The power wire 22 includes a conductor wire 23, an insulation layer 24, and a shield layer 25 which are disposed in this order from the axis of the power wire 22 to the outside of the power wire 22. It is noted that the power wire 22 may include a heat insulating layer, a shock absorption layer, and the like. The conductor wire 23 is electrically connected to the in-vehicle electric power supply 15. The insulation layer 24 provides insulation between the conductor wire 23 and the shield layer 25. The shield layer 25 suppresses noise flowing out from the conductor wire 23 to the outside and noise flowing in from the outside to the conductor wire 23.

The vehicle-side connector 31 includes a rectangular tubular receiving portion 32, a rectangular tubular wire insertion portion 33, a rectangular columnar first support portion 34, a rectangular tubular projection portion 35, and a seal member 36 surrounding the outer periphery of the projection portion 35. The axial direction of the receiving portion 32 extends in the same direction as the axial direction of the wire insertion portion 33. The receiving portion 32 and the wire insertion portion 33 are disposed adjacently to each other in the axial direction of the receiving portion 32. The projection portion 35 projects from the wire insertion portion 33 to the inside of the receiving portion 32. The inner surface of the wire insertion portion 33 and the inner surface of the projection portion 35 are formed continuously. The first support portion 34 projects from the inside of the projection portion 35 into the receiving portion 32. The receiving portion 32, the wire insertion portion 33, and the projection portion 35 are made of resin, namely synthetic resin, and are formed integrally. The first support portion 34 is made of synthetic resin. The power wire 22 is inserted into the wire insertion portion 33 from the outside of the vehicle-side connector 31 and passes through the inside of the wire insertion portion 33.

The vehicle-side connector 31 includes a first conductive portion 41 made of metal, a first shield 42 made of metal, and a connecting body 43 that electrically connects the shield layer 25 and the first shield 42. Part of the first conductive portion 41 is embedded in the first support portion 34, and part of the first conductive portion 41 projects from the first support portion 34 to the inside of the receiving portion 32. In other words, the first conductive portion 41 is disposed inside the receiving portion 32. The first shield 42 has a rectangular tubular shape. The first shield 42 extends from the inside of the wire insertion portion 33 to the inside of the receiving portion 32. More specifically, the first shield 42 is disposed along the inner circumferential surface of the wire insertion portion 33 in the wire insertion portion 33, and the first shield 42 is provided so as to surround the first support portion 34 in the receiving portion 32. Part of the first shield 42 projects from the tip of the projection portion 35. The first shield 42 is disposed between the receiving portion 32 and the first conductive portion 41.

As shown in FIG. 2, the first shield 42 includes a shield main body 44 having a plate shape and a convex portion 45 projecting from the shield main body 44. The first shield 42 shields noise. The convex portion 45 projects in a direction away from the first support portion 34 in the plate thickness direction of the shield main body 44. In other words, the convex portion 45 projects toward an inner surface M1 of the receiving portion 32. The first shield 42 has a cutout 46 formed through the shield main body 44 around the convex portion 45. The cutout 46 of the present embodiment has a U-shape. The convex portion 45 and the cutout 46 are disposed facing part of the first support portion 34 located outside the projection portion 35. A plurality of convex portions 45 and cutouts 46 are provided at intervals in the circumferential direction of the shield main body 44. For example, the convex portion 45 and the cutout 46 are provided for each of the four wall portions forming the rectangular tubular first shield 42.

The connecting body 43 is made of metal and has a tubular shape. The connecting body 43 is disposed in the wire insertion portion 33. The power wire 22 is inserted through the connecting body 43. The shield layer 25 of the power wire 22 is in contact with the inner surface of the connecting body 43, and the first shield 42 is in contact with the outer surface of the connecting body 43. Thus, the shield layer 25 and the first shield 42 are electrically connected.

As shown in FIG. 1, the compressor-side connector 71 is formed integrally with an inverter case 52 that accommodates the inverter 14. The electric compressor 10 includes a connector-integrated case 51, and the connector-integrated case 51 includes the inverter case 52 and the compressor-side connector 71.

The connector-integrated case 51 has a plate shape and includes a shield portion 53 made of a metal, a first resin portion 54 made of a resin (synthetic resin) and a second resin portion 55 made of a resin (synthetic resin), which are layered on the shield portion 53, and a connecting member 56 embedded in the second resin portion 55. The first resin portion 54 and the second resin portion 55 are provided so as to overlap the shield portion 53.

The inverter case 52 includes a bottomed tubular accommodation portion 57 and a case-side projection portion 58 projecting from the accommodation portion 57 in the direction that intersects the axial direction of the accommodation portion 57. The inverter case 52 includes a case shield 59 which is a part of the shield portion 53, a first case portion 60 which is a part of the first resin portion 54, a second case portion 61 which is a part of the second resin portion 55, and a connecting terminal 62 which is part of the connecting member 56. The first case 60 is provided so as to be layered on the case shield 59. In other words, the first case 60 overlaps with the case shield 59.

The case shield 59 includes a tubular extending portion 63 extending toward the inside of the accommodation portion 57. The connecting terminal 62 extends through the extending portion 63 and into the accommodation portion 57. The connecting terminal 62 is electrically connected to the inverter 14. The case shield 59 shields noise.

As shown in FIGS. 2 and 3, the compressor-side connector 71 projects from the case-side projection portion 58 in the axial direction of the accommodation portion 57. The compressor-side connector 71 projects from the case-side projection portion 58 toward the housing 11.

The compressor-side connector 71 includes an insertion portion 72 having a rectangular tubular shape, a rib 73 projecting from the outer surface M2 of the insertion portion 72, a second support portion 74 disposed inside the insertion portion 72, and a shield support portion 75. The insertion portion 72, the shield support portion 75, and the rib 73 forms part of the first resin portion 54, and are formed integrally with the first case portion 60. The first case portion 60 corresponds to the resin case portion, which is formed integrally with the insertion portion 72 and the rib 73. The second support portion 74 is a part of the second resin portion 55 and is formed integrally with the second case portion 61.

The insertion portion 72 includes a proximal end portion 81 that is formed continuous with the case-side projection portion 58 in the axial direction and a distal end portion 82 that is located away from the case-side projection portion 58 as compared with the proximal end portion 81. The dimension of the inner circumference of the proximal end portion 81 is smaller than the dimension of the inner circumference of the distal end portion 82. That is, the cross-sectional area of the proximal end portion 81 in the direction extending perpendicularly to the axial direction of the insertion portion 72 is smaller than the cross-sectional area of the distal end portion 82 in the direction extending perpendicularly to the axial direction of the insertion portion 72.

Figure 4:
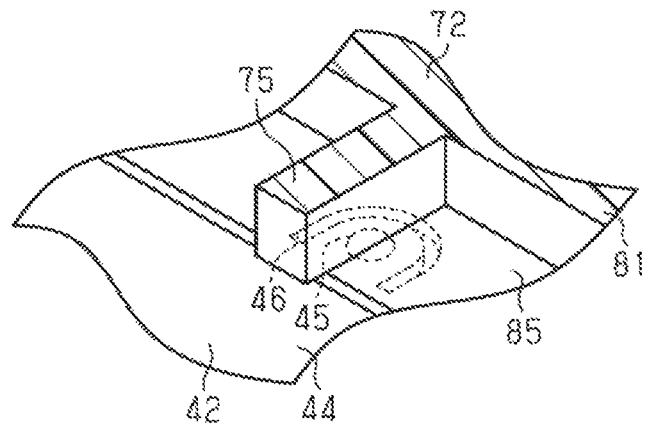
FIG. 4 is a perspective view of a shield support portion.

As shown in FIGS. 3 and 4, the shield support portion 75 projects from the proximal end portion 81 toward the inside of the distal end portion 82. The shield support portion 75 extends from the proximal end portion 81 in the axial direction of the insertion portion 72. A plurality of shield support portions 75 is provided.

As shown in FIG. 3, the rib 73 extends in the axial direction of the insertion portion 72. For example, the compressor-side connector 71 includes a plurality of ribs 73, which are disposed at an interval in the direction extending perpendicular to the axial direction of the insertion portion 72. The projecting length of the rib 73 from the outer surface M2 is set so that the rib 73 is large enough to fill the gap defined between the inner surface M1 of the receiving portion 32 and the outer surface M2 of the insertion portion when the insertion portion 72 is inserted into the receiving portion 32. In other words, the rib 73 is disposed between the inner surface M1 of the receiving portion 32 and the outer surface M2 of the insertion portion 72.

Figure 5:
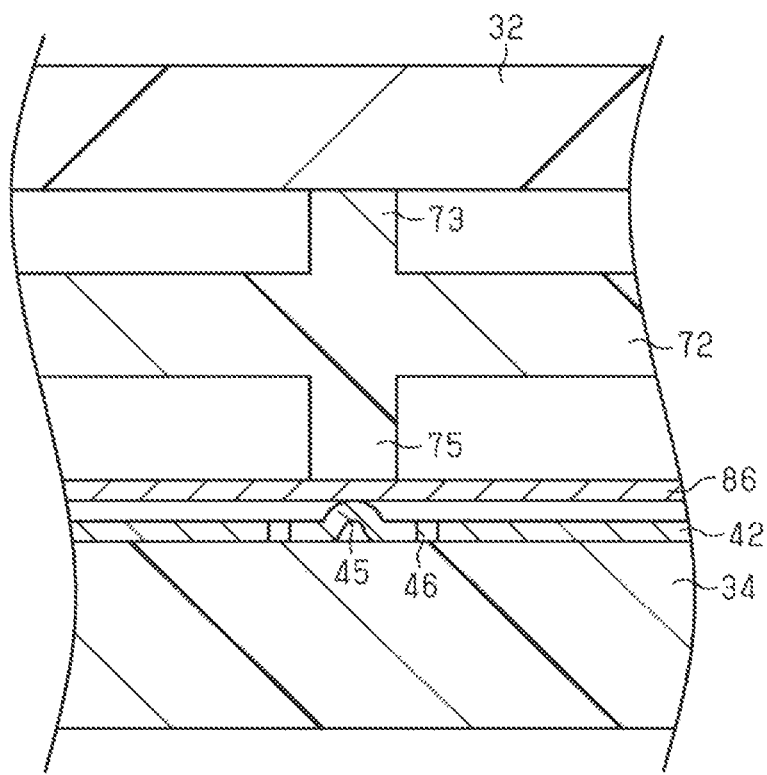
FIG. 5 is a cross-sectional view of a rib and the shield support portion taken along line 5-5 of FIG. 3.

As shown in FIG. 5, the shield support portion 75 is disposed at a position overlapping the rib 73 through the insertion portion 72. Thus, the rib 73 and the shield support portion 75 overlaps each other via the insertion portion 72 in the direction extending perpendicularly to the axial direction of the insertion portion 72.

As shown in FIG. 3, the second support portion 74 is located inside the proximal end portion 81 of the insertion portion 72. The second support portion 74 has a connection hole 83 that is opened at the distal end surface. The connection hole 83 of the present embodiment has a rectangular shape in cross section. The size of the connection hole 83 is formed large enough to receive the first conductive portion 41 so that the first conductive portion 41 may be inserted into the connection hole 83.

The compressor-side connector 71 includes a second conductive portion 84 made of metal and a second shield 85 made of metal. The second conductive portion 84 is a part of the connecting member 56 and is formed integrally with the connecting terminal 62. The second conductive portion 84 is embedded in the second support portion 74. In other words, the second conductive portion 84 is disposed inside the insertion portion 72. The second conductive portion 84 includes a holding portion 86 having parts which faces each other.

The second shield 85 is a part of the shield portion 53 and formed integrally with the case shield 59. The second shield 85 has a rectangular tubular shape. The second shield 85 extends from the case-side projection portion 58 to the inside of the distal end portion 82. Specifically, part of the second shield 85 is disposed between the inner surface of the proximal end portion 81 and the outer surface of the second support portion 74, and part of the second shield 85 projects in the distal end portion 82 further than to the distal end surface of the second support portion 74. The second shield 85 is disposed between the second conductive portion 84 and the insertion portion 72.

The vehicle-side connector 31 and the compressor-side connector 71 are fitted to each other. The first conductive portion 41 is in contact with the second conductive portion 84 via the connection hole 83. With the first conductive portion 41 and the second conductive portion 84 electrically connected, the in-vehicle electric power supply 15 and the inverter 14 are electrically connected to each other. The insertion portion 72 is inserted into the receiving portion 32 with the vehicle-side connector 31 and the compressor-side connector 71 fitted to each other.

The rib 73 is in contact with the inner surface M1 of the receiving portion 32. Specifically, part of the surface of the rib 73 facing the inner surface M1 of the receiving portion 32 is in contact with the inner surface M1 of the receiving portion 32. Although the illustration is omitted, the inner surface M1 of the receiving portion 32 is inclined such that the distance between the inner surfaces M1 facing each other is decreased toward the wire insertion portion 33 from the opening of the receiving portion 32. This is due to the inclination required for mold release, that is, the draft angle when manufacturing the vehicle-side connector 31. The spaced distance between the inner surface M1 of the receiving portion 32 and the outer surface M2 of the insertion portion 72 also changes depending on the position in the axial direction of the receiving portion 32. The rib 73 is placed in contact with the receiving portion 32 at a position where the spaced distance between the inner surface M1 of the receiving portion 32 and the outer surface M2 of the insertion portion 72 and the projecting length of the rib 73 from the outer surface M2 becomes substantially equal to each other. With the rib 73 in contact with the receiving portion 32, part of the gap between the receiving portion 32 and the insertion portion 72 where the rib 73 is in contact with the receiving portion 32 is filled.

The first shield 42 is inserted into the second shield 85. The first shield 42 and the second shield 85 are placed in contact with each other. This causes the convex portion 45 of the first shield 42 to project toward the second shield 85, and the convex portion 45 is pressed against the second shield 85. Thus, a reaction force from the second shield 85 acts on the convex portion 45, which bends the shield main body 44 around the convex portion 45 in the thickness direction thereof.

With the vehicle-side connector 31 and the compressor-side connector 71 fitted to each other, the shield support portion 75 is disposed facing part of the second shield 85 in contact with the convex portion 45. The shield support portion 75 is located in the projecting direction of the convex portion 45. Thus, the shield support portion 75 is disposed at a position where the shield support portion 75 cooperates with the convex portion 45 to hold therebetween the second shield 85. The shield support portion 75 and the rib 73 are disposed at positions facing each other across the insertion portion 72, so that the convex portion 45, the shield support portion 75, and the rib 73 are disposed linearly in the direction that extending perpendicularly to the axial direction of the insertion portion 72, or projecting direction of the convex portion 45.

The following will describe the operation of the present embodiment. If the compressor-side connector 71 does not have the rib 73, the vehicle-side connector 31 and the compressor-side connector 71 are in contact with each other at three contact points, namely, a contact point between the first shield 42 and the second shield 85, a contact point between the seal member 36 and the inner surface of the insertion portion 72, and a contact point between the first conductive portion 41 and the second conductive portion 84. If the power wire 22 swings in this state, the holding force may become insufficient only with the three contact points. In particular, the conductor wire 23 used for the power wire 22 is made of metal such as copper, and the weight of the power wire 22 is heavy. Thus, a large force is applied to the vehicle-side connector 31 by the swing of the power wire 22. In addition, in the case where the electric compressor 10 is mounted on a hybrid vehicle, if the electric compressor 10 is mounted to the engine, vibration from the engine is also applied to the electric compressor 10. Due to these relative vibrations, wear occurs at the contact point between the vehicle-side connector 31 and the compressor-side connector 71.

In the electric compressor 10 of the present embodiment, the compressor-side connector 71 is formed with rib 73. The rib 73 is formed integrally with the outer surface M2 of the insertion portion 72 and is in contact with the inner surface M1 of the receiving portion 32. It can be said that the rib 73 serves as a contact point between the vehicle-side connector 31 and the compressor-side connector 71. This increases the holding force between the vehicle-side connector 31 and the compressor-side connector 71.

Further, in inserting the insertion portion 72 into the receiving portion 32, it becomes difficult to insert the insertion portion 72 if there is no gap between the receiving portion 32 and the insertion portion 72. Therefore, the vehicle-side connector 31 and the compressor-side connector 71 are manufactured so that a gap is formed between the receiving portion 32 and the insertion portion 72. On the other hand, such gap allows the vehicle-side connector 31 and the compressor-side connector 71 to be dislocated relative to each other, so that the gap formed between the receiving portion 32 and the insertion portion 72 may cause relative dislocation of the vehicle-side connector 31 and the compressor-side connector 71. The rib 73 is disposed so as to fill this gap, so that the relative dislocation between the connectors 31 and 71 may be suppressed. In addition, the rib 73 is provided to fill part of the gap between the receiving portion 32 and the insertion portion 72, which suppresses the deterioration of the insertability of the insertion portion 72, as compared with the case where the gap is not formed.

The compressor-side connector 71 includes the shield support portion 75. In a case that the shield support portion 75 is not provided, the second shield 85 may be bent toward the inner surface of the insertion portion 72 when a force from the convex portion 45 is applied to the second shield 85. The bending of the second shield 85 decreases a force generated at the contact point between the first shield 42 and the second shield 85, which reduces the pressing force of the first shield 42 and the second shield 85 against each other. On the other hand, suppressing the bending of the second shield 85 by forming the shield support portion 75 permits suppressing a decrease in the holding force.

The following will describe the effect of the present embodiment.

(1) The rib 73 increases the contact point between the vehicle-side connector 31 and the compressor-side connector 71. As a result, relative dislocation between the vehicle-side connector 31 and the compressor-side connector 71 may be suppressed, as compared with the case where the rib 73 is not provided. In particular, the rib 73 is disposed so as to fill a gap formed between the receiving portion 32 and the insertion portion 72, which suitably suppresses the dislocation of the vehicle-side connector 31 and the compressor-side connector 71 relative to each other.

(2) Since the insertion portion 72 and the rib 73 are formed integrally with the inverter case 52, the rigidity of the insertion portion 72 and the rib 73 may be increased. This improves the vibration resistance of the insertion portion 72 and the rib 73, with the result that the dislocation of the vehicle-side connector 31 and the compressor-side connector 71 relative to each other may be further suppressed. The inverter case 52 includes the case shield 59 that is made of metal and the first case portion 60 that is made of resin, so that the inverter case 52 is lightweight and provides the great rigidity without deteriorating noise resistance.

(3) The compressor-side connector 71 includes the shield support portion 75. The bending of the second shield 85 may be suppressed by the shield support portion 75, so that the force pressing against the first shield 42 and the second shield 85 each other may be increased. Thus, the holding force between the vehicle-side connector 31 and the compressor-side connector 71 may be further enhanced.

(4) The rib 73 and the shield support portion 75 overlap with each other via the insertion portion 72. Since the shield support portion 75 may be supported by the rib 73, the shield support portion 75 is less likely to be deformed. Accordingly, the holding force by the vehicle-side connector 31 and the compressor-side connector 71 may be further enhanced.

The present embodiment may be modified in various manners, as exemplified below.

The present embodiment and the following modification may be combined within the scope of the present disclosure.

The rib 73 and the shield support portion 75 need not necessarily overlap with each other via the insertion portion 72. That is, the rib 73 and the shield support portion 75 may be disposed at different positions in the direction extending perpendicularly to the axial direction of the insertion portion 72.

The shield support portion 75 need not necessarily be provided.

The compressor-side connector 71 and the inverter case 52 need not necessarily be integrally formed. For example, the inverter case may be made of metal, and the compressor-side connector 71 that is formed separately from the inverter case may be attached to the inverter case.

The inverter case 52 need not necessarily include the second case portion 61 as long as it includes the first case portion 60 having the insertion portion 72 and the rib 73 formed integrally therewith.

The convex portion 45 may be formed projecting from the second shield 85 toward the first shield 42. In other words, the convex portion 45 may be formed in the first shield 42, or may be formed in the second shield 85. If the convex portion 45 is provided on the second shield 85, the vehicle-side connector 31 includes a shield support portion that is positioned in the projecting direction of the convex portion 45, and that holds the first shield 42 with the convex portion 45. It can be said that the shield support portion cooperates with the convex portion 45 to hold one of the first shield 42 and the second shield 85 that does not have the convex portion 45.

The rib 73 may be formed integrally with the inner surface M1 of the receiving portion 32 and in contact with the outer surface M2 of the insertion portion 72. In other words, the rib 73 may be formed in the vehicle-side connector 31, or in the compressor-side connector 71.

The number of the ribs 73 may be appropriately changed. It is noted that the number of the ribs 73 may be one or more.

The vehicle-side connector 31 and the compressor-side connector 71 may be provided as the second connector and the first connector, respectively, so that the vehicle-side connector 31 is to be inserted into the compressor-side connector 71. In other words, the inserting member and the receiving member of the connector members of the present embodiment may be reversed. In this case, the compressor-side connector 71 is formed with the receiving portion 32, the first conductive portion 41, the first shield 42, and the like, and the vehicle-side connector 31 is formed with the insertion portion 72, the second conductive portion 84, the second shield 85, and the like.

The electric compressor may be used for compressing air as a fluid to supply the compressed air to the fuel cell.

What is claimed is:

1. An electric compressor for a vehicle comprising:
an inverter that converts direct current electric power supplied from an in-vehicle power supply to alternating current electric power;
a motor driven by the alternating current electric power outputted from the inverter; and a first connector and a second connector electrically connecting the in-vehicle power supply and the motor with the first connector and the second connector being fitted to each other, wherein the first connector includes:
- a tubular receiving portion made of resin,
- a first conductive portion disposed inside the receiving portion, and
- a first shield that is made of metal and is disposed between the receiving portion and the first conductive portion the second connector includes:
- a tubular insertion portion made of resin and insertable into the receiving portion,
- a second conductive portion disposed inside the insertion portion and connected to the first conductive portion, and
- a second shield that is made of metal and is disposed between the insertion portion and the second conductive portion, and the insertion portion includes a distal end portion that is disposed adjacent to the first connector and a proximal end portion that is disposed opposite from the distal end portion in an insertion direction in which the insertion portion is inserted, one of the first shield and the second shield has a convex portion projecting toward the other of the first shield and the second shield, a rib is disposed between an inner surface of the receiving portion and an outer surface of the insertion portion and extends in the insertion direction, wherein the rib is formed integrally with one of the inner surface and the outer surface, and is in contact with the other of the inner surface and the outer surface, one of the first connector and the second connector includes a shield support portion that is positioned in a projecting direction of the convex portion, wherein the other of the first shield and the second shield that does not have the convex portion is held between the shield support portion and the convex portion, the shield support portion causes the first shield and the second shield to be in contact so as to be electrically connected, and the shield support portion is a projection that projects toward the convex portion and extends in the insertion direction so as to overlap with the rib across the insertion portion.

2. The electric compressor for the vehicle according to claim 1, wherein
the inverter is accommodated in an inverter case,
the inverter case includes a case shield that is made of a metal and formed integrally with the second shield, and a resin case portion that is made of resin and overlaps the case shield, and
the insertion portion and the rib are formed integrally with the resin case portion.

* * * * *